United States Patent
Vazquez et al.

(10) Patent No.: US 9,450,942 B1
(45) Date of Patent: *Sep. 20, 2016

(54) ACCESS TO RESOURCES

(71) Applicant: MicroStrategy Incorporated, Vienna, VA (US)

(72) Inventors: Hector Vazquez, Ashburn, VA (US); Konstantin Angelov, Vienna, VA (US); Sergey Mironenko, Vienna, VA (US); Charlie Benatti, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,167

(22) Filed: Apr. 23, 2015

Related U.S. Application Data

(63) Continuation of application No. 13/919,778, filed on Jun. 17, 2013, now Pat. No. 9,038,152.

(60) Provisional application No. 61/783,551, filed on Mar. 14, 2013.

(51) Int. Cl.
| | |
|---|---|
| *H04L 29/00* | (2006.01) |
| *H04L 29/06* | (2006.01) |
| *H04L 29/08* | (2006.01) |
| *H04L 29/12* | (2006.01) |

(52) U.S. Cl.
CPC ............ *H04L 63/08* (2013.01); *H04L 61/609* (2013.01); *H04L 67/18* (2013.01)

(58) Field of Classification Search
CPC combination set(s) only.
See application file for complete search history.

(56) References Cited

U.S. PATENT DOCUMENTS

| | | | |
|---|---|---|---|
| 7,962,755 B2* | 6/2011 | Pizano | G06F 21/32 713/186 |
| 9,076,006 B1* | 7/2015 | Saylor | |
| 2007/0079135 A1* | 4/2007 | Saito | G06F 21/35 713/183 |
| 2011/0154464 A1 | 6/2011 | Agarwal et al. | |
| 2011/0277024 A1 | 11/2011 | Begley et al. | |

(Continued)

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

(Continued)

*Primary Examiner* — Ghazal Shehni
(74) *Attorney, Agent, or Firm* — Fish & Richardson P.C.

(57) ABSTRACT

A method performed by one or more processing devices, comprising: receiving a request for a quick response code associated with the hosted resource; generating a reference code that references information included in the request; and encoding the reference code into the requested quick response code; transmitting information indicative of the quick response code to the system hosting the resource; receiving a request for access to a resource, the request for access comprising a decoded version of the quick response code; determining that access is requested for the hosted resource; determining that a user who is requesting access to the hosted resource is permitted to access the hosted resource; responsive to determining that the user is permitted to access the hosted resource, transmitting a token for permitting the user to access the hosted resource; and transmitting a message specifying that the user is granted access to the hosted resource.

18 Claims, 9 Drawing Sheets

(56) References Cited

U.S. PATENT DOCUMENTS

2012/0187187 A1* 7/2012 Duff .................. G06Q 20/3276
                                                       235/382
2013/0163537 A1* 6/2013 Anderson ......... H04W 72/1284
                                                       370/329

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

USPTO Nonfinal Office Action dated Nov. 3, 2014 for U.S. Appl. No. 13/919,778, 16 pages.

Response to Nonfinal Office Action of Nov. 3, 2015 for U.S. Appl. No. 13/919,778, filed Feb. 3, 2015, 14 pages.

USPTO Notice of Allowance dated Feb. 20, 2015 for U.S. Appl. No. 13/919,778, 6 pages.

Vazquez et al., Patent Application "Access to Resources" for U.S. Appl. No. 13/919,778, filed Jun. 17, 2013, 49 pages.

\* cited by examiner

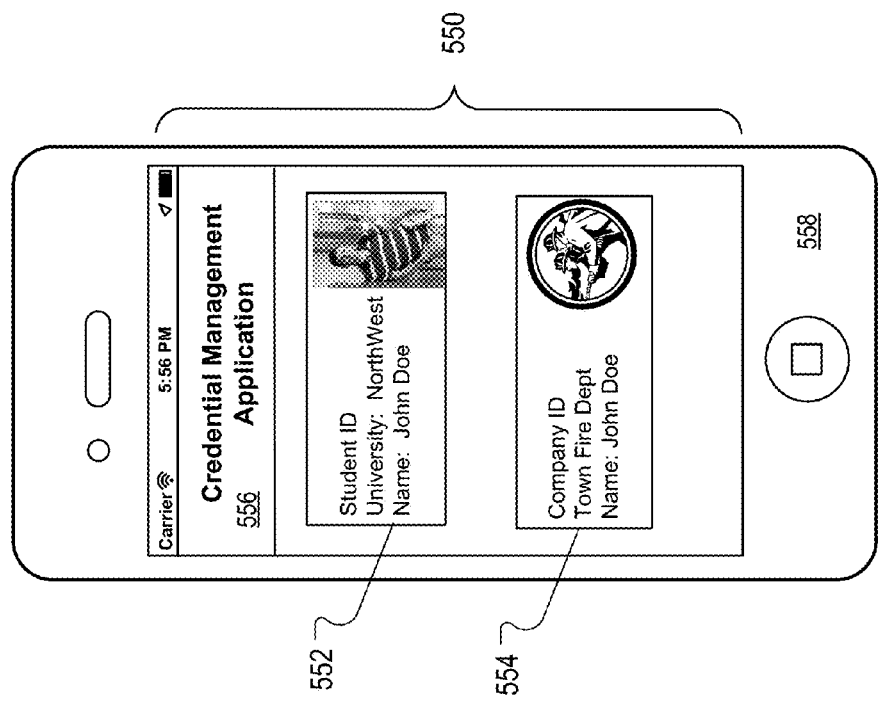

ACCESS TO RESOURCES

CLAIM OF PRIORITY

This application is a continuation of U.S. application Ser. No. 13/919,778, filed on Jun. 17, 2013, which claims priority under 35 U.S.C. §119(e) to provisional U.S. Patent Application No. 61/783,551, filed on Mar. 14, 2013, the entire contents of which are hereby incorporated by reference.

BACKGROUND

Generally, a credential may identify a person as being associated with a particular entity and/or as being authorized to access various types of information, including, e.g., a resource.

SUMMARY

One aspect of the subject matter described in this specification can be embodied in methods that include the actions of receiving, from a system hosting a resource, a request for a quick response code associated with the hosted resource; responsive to receiving the request for the quick response code associated with the hosted resource, generating, based on contents of the request, a reference code that references information included in the request; and encoding the reference code into the requested quick response code; transmitting information indicative of the quick response code to the system hosting the resource; receiving, from a client device, a request for access to a resource, the request for access comprising a decoded version of the quick response code; determining, based on the decoded version of the quick response code, that access is requested for the hosted resource; determining, based on contents of the request for access, that a user who is requesting access to the hosted resource is permitted to access the hosted resource; responsive to determining that the user is permitted to access the hosted resource, transmitting, to the system hosting the resource, a token for permitting the user to access the hosted resource; and transmitting, to the client device, a message specifying that the user is granted access to the hosted resource. Other embodiments of this aspect include corresponding computer systems, apparatus, computer programs recorded on one or more computer storage devices and machine-readable media storing instructions that are executable a processing device, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Another aspect of the subject matter described in this specification can be embodied in methods that include the actions receiving, from a system hosting a resource, a request for a representation of a reference code associated with the hosted resource; responsive to receiving the request for the representation of the reference code, generating the reference code associated with the hosted resource; and generating, based on contents of the reference code, the representation of the reference code, wherein the reference code is encoded within the representation; transmitting information indicative of the generated representation of the reference code to the system hosting the resource; receiving, from a client device, a request for access to a resource, the request for access comprising a decoded version of the representation of the reference code; determining, based on the decoded version of the representation of the reference code, that access is requested for the hosted resource; determining, based on contents of the request for access, that a user who is requesting access to the hosted resource is permitted to access the hosted resource; responsive to determining that the user is permitted to access the hosted resource, transmitting, to the system hosting the resource, a token for permitting the user to access the hosted resource; and transmitting, to the client device, a message specifying that the user is granted access to the hosted resource. Other embodiments of this aspect include corresponding computer systems, apparatus, computer programs recorded on one or more computer storage devices, and machine-readable media storing instructions that are executable a processing device, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In one embodiment, the request for access further comprises an indication of a geographic location of the client device, and the actions further include determining that the geographic location of the client device is in a region from which the user is allowed to access the resource; wherein determining, based on contents of the request for access, that the user who is requesting access to the hosted resource is permitted to access the hosted resource comprises: responsive to determining that the geographic location of the client device is in the region from which the user is allowed to access the resource, determining that the user who is requesting access to the hosted resource is permitted to access the hosted resource comprises. In still another embodiment, determining, based on the contents of the request for access, that the user who is requesting access to the hosted resource is permitted to access the hosted resource comprises: determining, based on the contents of the request for access, an identity of the user who is requesting access to the hosted resource; identifying, based on the identity of the user, one or more credentials of the user that have been granted by an entity associated with the hosted resource; and determining, based on the identified one or more credentials, that the user is permitted to access the hosted resource.

In still another embodiment, the client device comprises a first client device, and wherein receiving the request for the representation of the reference code for accessing the hosted resource comprises: receiving request information, the request information comprising (i) information indicative of a resource identifier of the hosted resource, (ii) information indicative of an action type, the action type specifying that access to the hosted resource is requested, (iii) a session identifier that identifies a session established between a second client device and the system hosting the resource, wherein the second client device is for viewing the hosted resource, (iv) a certificate that identifies an entity associated with the hosted resource, and (v) information indicative of a time to live value, with the time to live value specifying an amount of time for which the representation of the reference code is active; storing the request information in a data repository; and generating associations among items of the received request information and the generated reference code, wherein the reference code references the received request information through the associations.

In still another embodiment, the actions include responsive to determining that the user is permitted to access the hosted resource, identifying the session identifier that is associated with the reference code for the hosted resource; identifying the resource identifier that is associated with the reference code for the hosted resource; and generating the token based on the identified session identifier and the identified resource identifier; wherein transmitting, to the system hosting the resource, the token for permitting the user to access the hosted resource comprises transmitting, to the system hosting the resource, the generated token for granting the user access to the hosted resource, wherein access to the hosted resource is granted through the session established between the second client device and the system hosting the resource.

In still another embodiment, the actions include determining a time at which the request for access to the resource is received; retrieving, from the data repository, information indicative of a time when the reference code is generated; determining an amount of time that has elapsed from the time when the reference code is generated to the time when the request for access to the resource is received; and determining that the amount of elapsed time is less than the amount of time specified by the time to live value; wherein determining, based on the contents of the request for access, the identity of the user who is requesting access to the hosted resource comprises: responsive to determining that the amount of elapsed time is less than the amount of time specified by the time to live value, determining, based on the contents of the request for access, the identity of the user who is requesting access to the hosted resource.

In one embodiment, the actions include determining, based on the action type included in the received request information, that access is being requested for the hosted resource; and generating a log specifying that one or more credentials of the user is used in gaining access to the hosted resource. In still another embodiment, the request for access to the resource comprises a first request for access to the resource, the reference code comprises a first reference code, and the actions further include determining a time at which a second request for access to the hosted resource is received; retrieving, from a data repository, information indicative of a time when a second reference code that references the hosted resource is generated; determining an amount of time that has elapsed from the time when the second reference code is generated to the time which the second request for access to the hosted resource is received; and determining that the amount of elapsed time is greater than an amount of time specified by a time to live value specified in the second request; responsive to determining that the amount of elapsed time is greater than the amount of time specified by the time to live value specified in the second request, denying the second request for access to the hosted resource; and transmitting, to the system hosting the resource, information specifying that the second request for access to the hosted resource is denied.

In another embodiment, the representation of the reference code comprises an optical machine-readable representation of the reference code. In still another embodiment, the optical machine-readable representation comprises a quick response code.

Still another aspect of the subject matter described in this specification can be embodied in methods that include the actions receiving, from a system hosting a resource, a request for a representation of a reference code associated with the hosted resource; responsive to receiving the request for the representation of the reference code, generating the reference code associated with the hosted resource; and generating, based on contents of the reference code, the representation of the reference code, wherein the reference code is encoded within the representation; transmitting information indicative of the generated representation of the reference code to the system hosting the resource; receiving, from a client device, a request for access to a resource, the request for access comprising a decoded version of the representation of the reference code; determining, based on the decoded version of the representation of the reference code, that access is requested for the hosted resource; determining, based on the contents of the request for access, an identity of a user who is requesting access to the hosted resource; identifying, based on the identity of the user, one or more credentials of the user that have been granted by an entity associated with the hosted resource; transmitting the identified one or more credentials to the system hosting the resource; responsive to transmitting the identified one or more credentials to the system hosting the resource, receiving, from the system hosting the resource, information specifying that the user is granted access to the hosted resource; and transmitting, to the client device, the received information specifying that the user is granted access to the hosted resource. Other embodiments of this aspect include corresponding computer systems, apparatus, computer programs recorded on one or more computer storage devices, and machine-readable media storing instructions that are executable a processing device, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In one embodiment, the request for access further comprises an indication of a geographic location of the client device, and the features include transmitting, to the system hosting the resource, the indication of the geographic location of the client device; and wherein responsive to transmitting the identified one or more credentials to the system hosting the resource, receiving, from the system hosting the resource, the information specifying that the user is granted access to the hosted resource comprises: responsive to transmitting the identified one or more credentials to the system hosting the resource and responsive to transmitting the indication of the geographic location of the client device to the system hosting the resource, receiving, from the system hosting the resource, the information specifying that the user is granted access to the hosted resource.

In still another embodiment, the features include determining a time at which the request for access to the resource is received; retrieving, from a data repository, information indicative of a time when the reference code is generated; determining an amount of time that has elapsed from the time when the reference code is generated to the time when the request for access to the resource is received; and determining that the amount of elapsed time is less than the amount of time specified by a time to live value for the reference code; wherein determining, based on the contents of the request for access, the identity of the user who is requesting access to the hosted resource comprises: responsive to determining that the amount of elapsed time is less than the amount of time specified by the time to live value, determining, based on the contents of the request for access, the identity of the user who is requesting access to the hosted resource. In yet another embodiment, the features include identifying a session identifier that is associated with the reference code, with the session identifier identifying a session established between the client device and the hosted resource; and transmitting, to the system hosting the resource, the session identifier for granting the user access to the hosted resource over the established session.

In still another embodiment, the representation of the reference code comprises a quick response code. In an embodiment, the features include determining that the decoded version of the representation of the reference code matches the reference code for the hosted resource; determining, based on the reference code for the hosted resource, the entity associated with the hosted resource for which access is requested; and responsive to determining the entity associated with the hosted resource for which access is requested, determining credentials granted by the entity; wherein identifying, based on the identity of the user, one or more credentials of the user that have been granted by an entity associated with the hosted resource comprises: identifying, from the credentials granted by the entity, one or more credentials associated with the user; and determining that at least one of the one or more credentials associated with the user and granted by the entity is associated with the resource identifier of the hosted resource.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 2, 3 and 5B illustrate examples of graphical user interfaces for an example of a credential management application.

DETAILED DESCRIPTION

Figure 1:
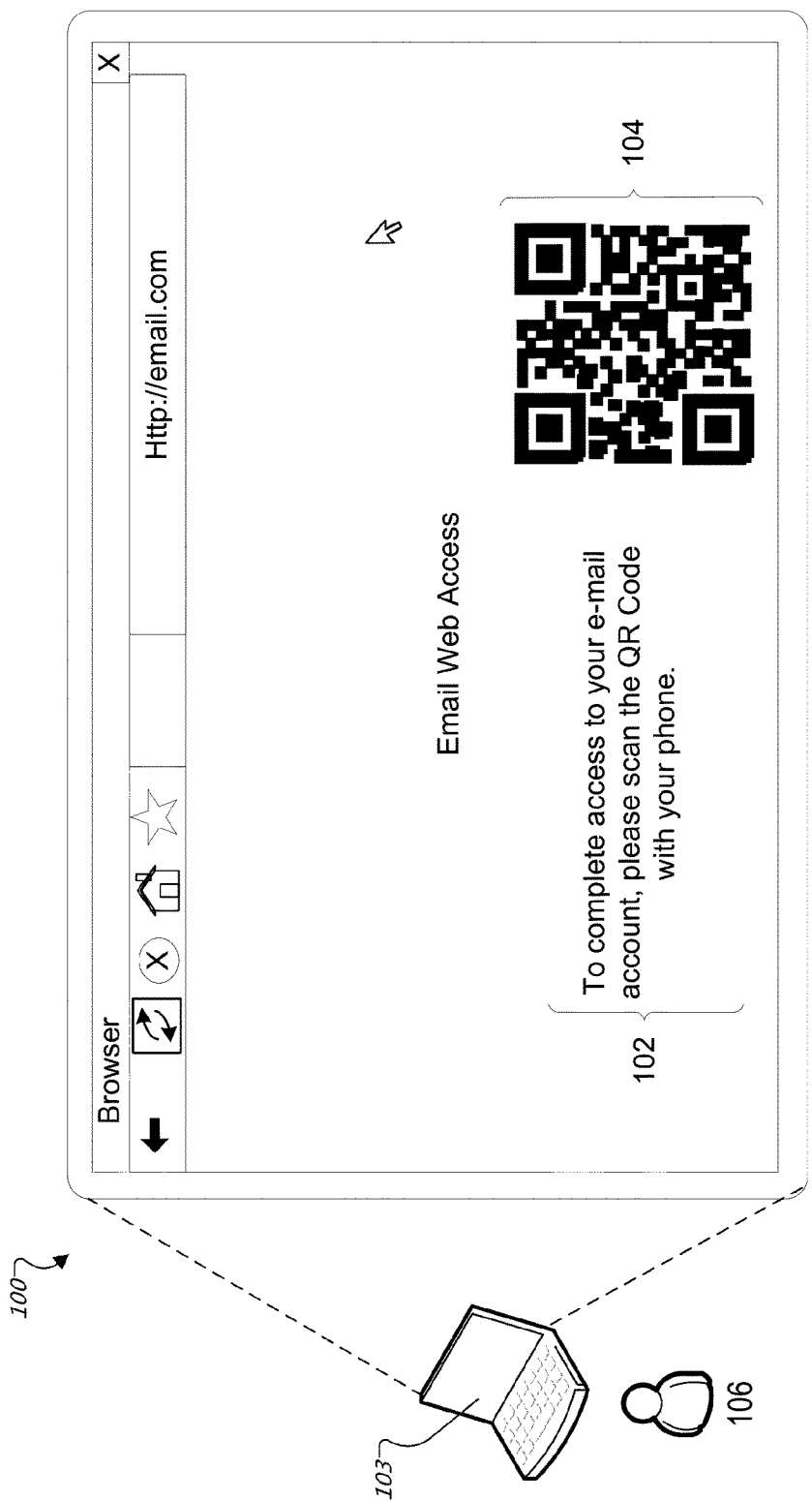
FIGS. 1 and 4 illustrate examples of graphical user interfaces of resources for which access is restricted to credentialed users.

A system consistent with this disclosure regulates access to resources. For example, the system may regulate access to resources by restricting access to credentialed users, e.g., users with credentials indicating that the users are authorized to access the resources. A resource may include an item of data and/or a device that is accessible from a network and/or a computing device. There are various types of resources, including, e.g., HTML pages, web pages, web sites, electronic user accounts (e.g., e-mail accounts, electronic banking accounts, etc.), word processing documents, portable document format (PDF) documents, images, videos, electronic files, applications, networks, computers, and so forth.

In an example, the system receives a request from a user to access a resource. In response to the request, the system causes an optical machine-readable representation of a reference code to be presented to the user. Generally, a reference code may include information that references an item of data, e.g., a resource. An optical machine-readable representation may be an arrangement of graphical elements that encode alphanumeric data, where the elements are arranged so that the data can be read by an optical scanner. For example, an optical machine-readable representation may be a bar code or a quick response (QR) code.

In this example, the user scans the optical machine-readable representation of the reference code using an application (e.g., a credential management application) executing on the user's mobile device. Generally, a credential management application includes computer software designed to interface with a credential management system that manages a user's credentials. In this example, the credential management application decodes the optical machine-readable representation of the reference code.

The credential management application transmits the decoded optical machine-readable representation of the reference code to the credential management system. The credential management application also transmits, to the credential management system, an indication of the identity of the user. Using the indication of the identity of the user, the credential management system identifies credentials held by the user. If the identified user is determined to hold a credential that entitles the user to access the resource referenced by the reference code, the user is granted access to the resource. If the identified user is not determined to hold a credential that entitles the user to access the resource referenced by the reference code, the user is denied access to the resource. In some implementations, if a period of time elapses after the system has presented the optical machine-readable representation of the reference code to the user without the user scanning the optical machine-readable representation of the reference code, a new reference code may be generated and a corresponding optical machine-readable representation of the new reference code may be presented to the user in place of the optical machine-readable representation of the previous reference code.

Referring to FIG. 1, computing device 103 displays, for user 106, a graphical user interface 100 of a resource (not shown). In this example, the resource is an email website for accessing email. In this example, access to the email website is restricted to users with credentials specifying that the users are authorized to access the email website. In this example, a session is established between computing device 103 and a server hosting the email website. In this example, the session is established when user 106 attempts to access the email website. In the example of FIG. 1, graphical user interface 100 displays QR code 104. In this example, QR code 104 is used by a credential management system (not shown) to reference the email website and the particular session that is established between computing device 103 and the email website. As described in further detail below, the credential management system may use QR code 104 (and/or information indicative of QR code 104) in verifying that user 106 possesses a credential that enables user 106 to access the email website that includes graphical user interface 100. As also described in further detail below, QR code 104 references the particular session that is established between computing device 103 and the email website to promote user 106 being granted access to the email website over the session that is already established between the email website and computing device 103. Graphical user interface 100 also displays prompt message 102 that prompts user 106 to scan QR code 104 to gain access to the email website. In some implementations, after a period of time elapses without user 106 scanning QR code 104, a new QR code may be generated and displayed in place of QR code 104. This process of refreshing the QR code may be repeated (e.g., periodically) until the user 106 scans the QR code.

Figure 2:
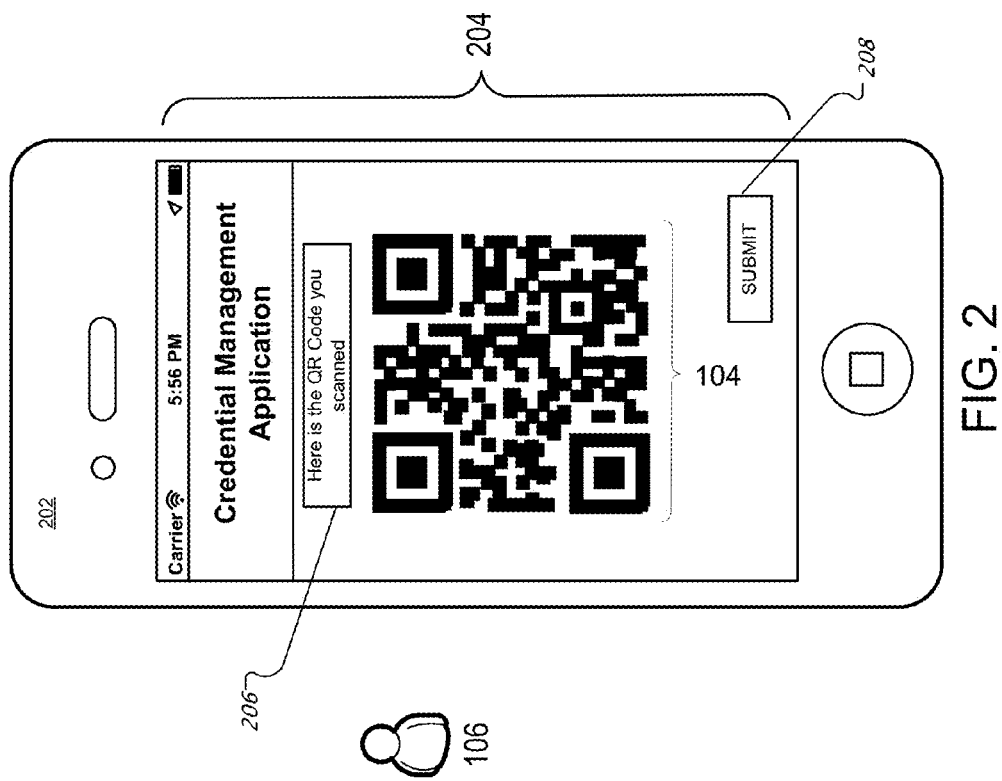

Referring to FIG. 2, user 106 also uses mobile device 202. In this example, mobile device 202 is configured to execute a credential management application (not shown). User 106 launches the credential management application and uses a camera (not shown) on mobile device 202 to take a picture of QR code 104 (FIG. 1). In the example of FIG. 2, the credential management application on mobile device 202 displays graphical user interface 204. Graphical user interface 204 displays message 206 notifying user 106 that QR code 104 is successfully scanned into the credential management application on mobile device 202. Graphical user interface 204 also displays submit control 208. Upon selection of submit control 208, the credential management application transmits, to a credential management system, information indicative of QR code 104. In an example, the credential management application generates the information indicative of QR code 104 by decoding QR code 104 into a string. The string includes information that references QR code 104.

In response to receipt of the string referencing QR code 104, the credential management system determines that user 106 holds one or more credentials that permit user 106 to access the email website, or, in some implementations, more particularly, to access a particular e-mail account accessible via the email website. In this example, the credential management system sends to mobile device 202 a message specifying that user 106 has been granted access to the email website.

Figure 3:
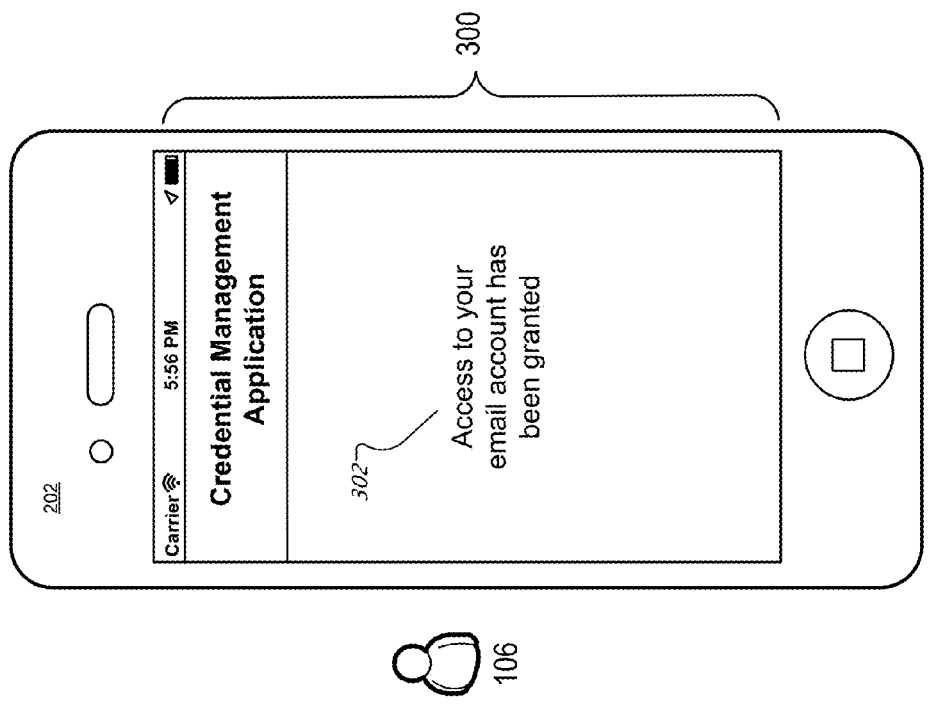

Referring to FIG. 3, mobile device 202 displays graphical user interface 300. In the example of FIG. 3, graphical user interface 300 is displayed in the credential management application. In the example of FIG. 3, graphical user interface 300 displays message 302 indicating that user 106 has been granted access to the email website.

Figure 4:
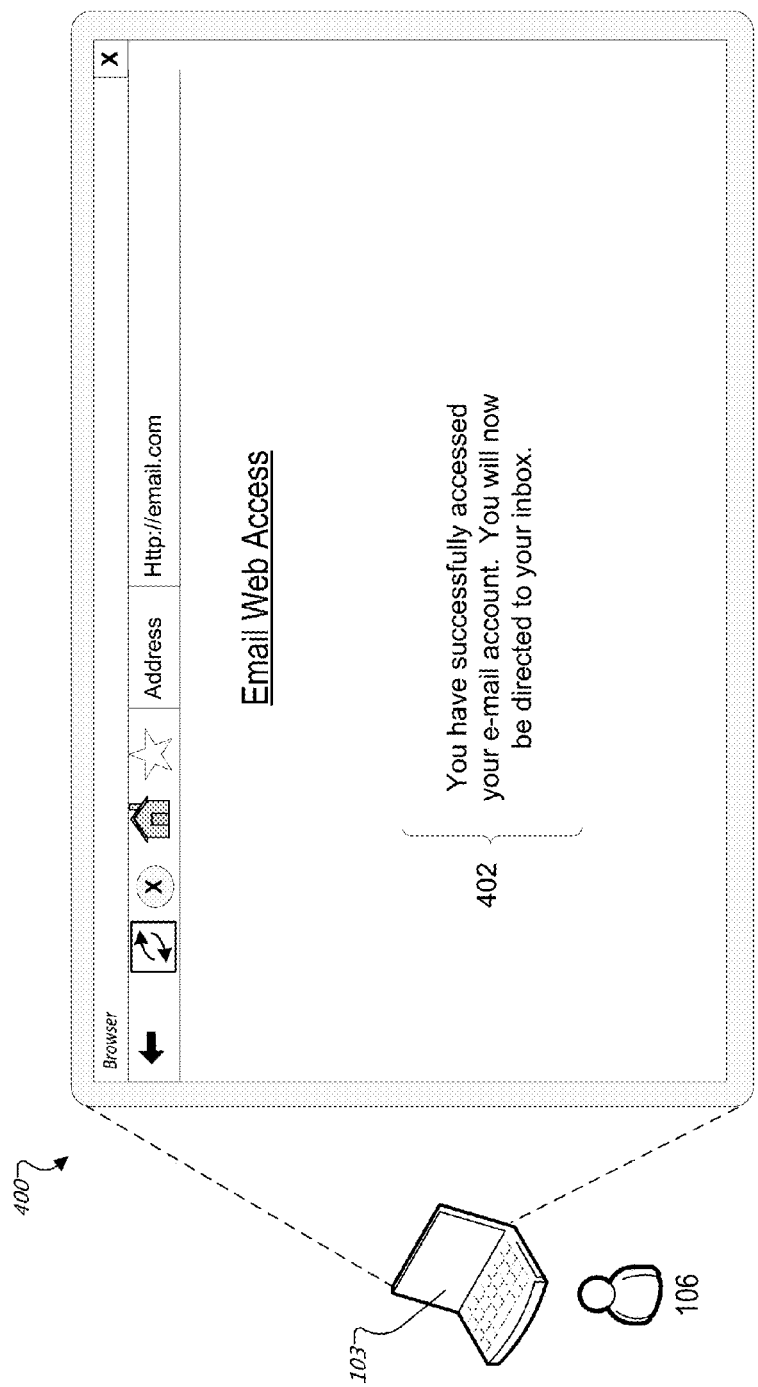

Referring to FIG. 4, computing device 103 displays graphical user interface 400, e.g., after user 106 has been granted access to the email website. In this example, graphical user interface 400 is one of the various graphical user made available via the email website. Graphical user interface 400 displays message 402 notifying user 106 that user 106 has been granted access to the email website, e.g., to view the e-mail inbox of user 106.

Figure 5A:
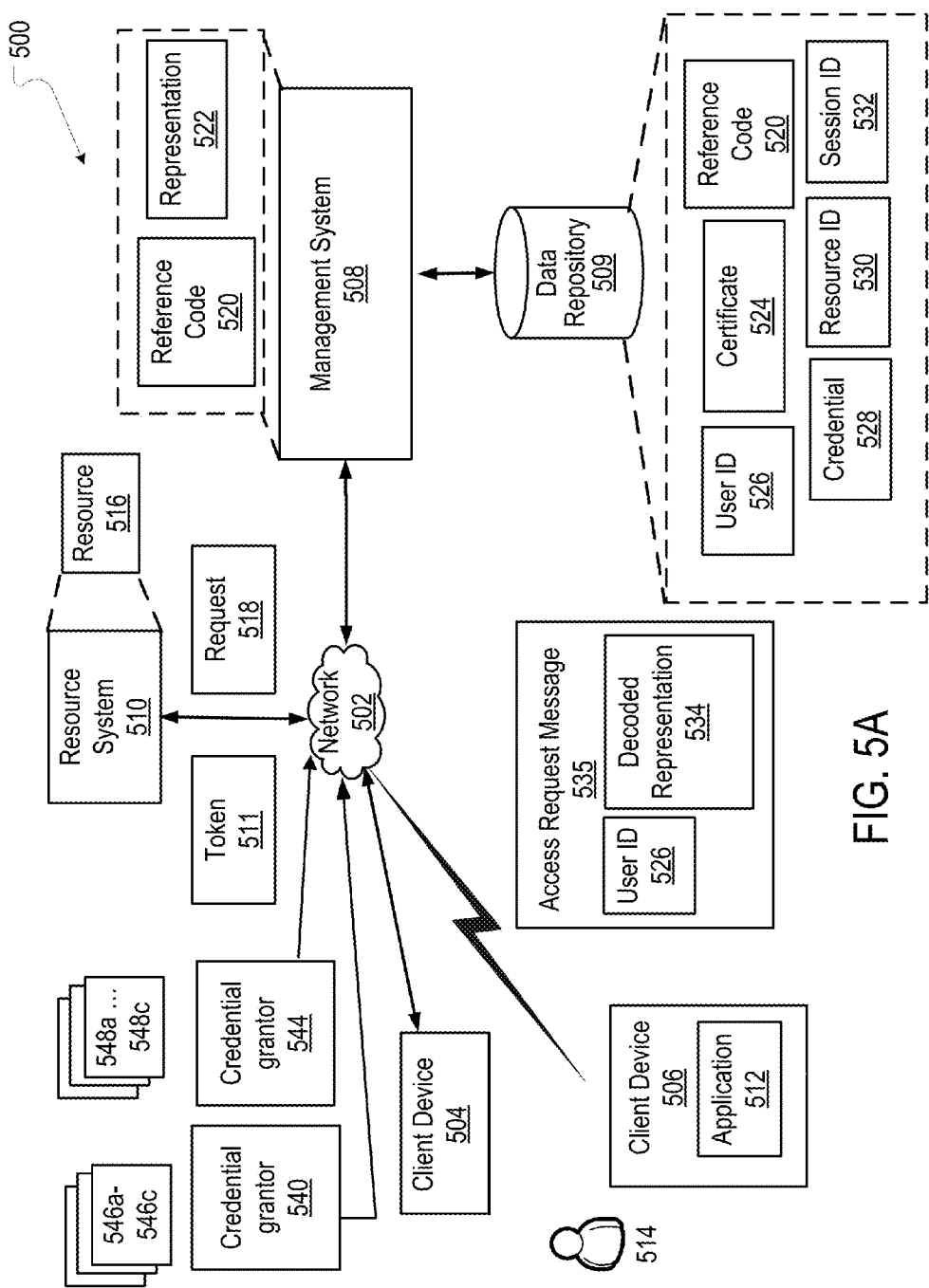
FIG. 5A is a block diagram of an example of a network environment that regulates access to resources.

FIG. 5A is a block diagram of an example of a network environment 500 that regulates access to resources. Network environment 500 includes network 502, client devices 504, 506, resource system 510, management system 508 and data repository 509. Management system 508 may include numerous servers that are configured to manage user credentials. In this example, management system 508 is a credential management system. Network environment 500 may include many thousands of data repositories, client devices, management systems and resource systems, which are not shown.

In the example of FIG. 5A, client devices 504, 506 are used by user 514. In this example, client device 506 executes application 512, including, e.g., a credential management application. In this example, resource system 510 hosts various resources, including, e.g., resource 516. Resource 516 can be various types of resources, including, e.g., HTML pages, web pages, web sites, electronic user accounts word processing documents, PDF documents, images, videos, electronic files, applications, networks, computers, and so forth. In an example, resource 516 includes the email website referenced in FIGS. 1 and 4. In an example, access to resource 516 is restricted to users holding credentials that authorize access to resource 516.

In an example, management system 508 manages credentials for users and groups of users. A credential may be evidence of authority, status, rights, or entitlement to privileges that can be, for example, a badge or identifier for membership in a group (e.g., an employee of a company, a graduate of a school, a professional certification), forms of personal identification (e.g., drivers' licenses, identity cards, passports, etc.), and so forth.

In an example, management system 508 generates a credential based on input provided by a credential grantor (e.g., credential grantors 540, 544). Generally, a credential grantor includes an entity that grants a credential to a user. For example, a credential grantor may be a company, a school, a professional certification organization, a government agency, and so forth. The credentials may include a variety of information, including, e.g., a description of an entity granting the credential (e.g., a school, a professional certification organization, a government agency, and so forth), a credential identifier that uniquely identifies the credential, and so forth. In addition to creation of credentials by credential grantors, credentials could be created at the request of users through a web-based or other interface, or through any other suitable mechanism such as sending email or short message service (SMS) to credential grantors.

In an example, credentials can be issued/granted by multiple different entities (e.g., credential grantors). In the example of FIG. 5A, environment 500 includes credential grantors 540, 544. In this example, credential grantors 540, 544 issue credentials through a single hub (i.e., management system 508), and different credentials issued by the same credential grantor may authorize different permissions. In the example of FIG. 5A, credential grantor 540 issues credential 528, which is stored in data repository 509. Credential grantor 544 issues another credential (e.g., for user 514 or for another user) that is stored in data repository 509 by management system 508. For example, credential grantor 540 may be an educational institute that grants its students credentials in the form of student IDs that identify students as attending the educational institute and that enable the students to access certain resources of the educational institute. In another example, credential grantor 544 may be an employer (e.g., a company) that grants its employees credentials in the form of employee IDs that identify individuals as being employees of the employer and that enable the employees to access certain resources of the employer. In the example of FIG. 5A, credential grantors 540, 544 use the issued credentials to regulate access to resources 546*a*-546*c* and 548*a*-548*c*, respectively. In this example where credential grantor 540 is an educational institute, resources 546*a*-546*c* may be e-learning websites. In this example where credential grantor 544 is an employer, 548*a*-548*c* may be corporate electronic documents. In the example of FIG. 5A, credential grantor 540 also regulates access to resource 516. In this example, credential grantor 540 uses resource system 510 to store resource 516.

In certain aspects, credentials also may be hierarchical. For example, a first credential may generally identify an individual as an employee of Company X, while a second credential identifies the individual more specifically as an executive of Company X, and a third credential identifies the individual as the Chief Executive Officer of Company X.

In operation, management system 508 manages and stores one or more credentials and associates users with appropriate credentials. In this example of FIG. 5A, credentials may be stored in data repository 509. For example, user 514 is associated with credential 528. In this example, credential 528 is stored in data repository 509.

Referring to FIG. 5B, client device 558 executes credential management application 556 that displays graphical user interface 550. Through credential management application 556, a user may manage multiple, different credentials issued by multiple, different organizations (i.e., credential grantors) from within a single application (i.e., credential management application 556). In the example of FIG. 5B, a user of client device 558 is issued credentials 552, 554. In this example, the user of client device 558 uses credential management application 556 to manage credentials 552, 554. In this example, credential 552 is issued by one credential grantor and credential 554 is issued by another, different credential grantor.

For example, the user of client device 558 may be a student attending a university and may work part time as a firefighter to earn tuition money. In this example, credential grantor 540 (FIG. 5A) is the educational institute that is attended by the user of client device 558. In this example, credential 552 may be issued by credential grantor 540, e.g., to enable the user of client device 558 to access one or more of resources 546*a*-546*c* (e.g., university computing resources). In this example, credential grantor 544 (FIG. 5A) is an employer (i.e., a local fire department) that employs the user of client device 558. In this example, credential 554 may be issued by credential grantor 544, e.g., to enable the user of client device 558 to access one or more of resources 548*a*-548*c* (e.g., fire department computing resources).

Referring back to FIG. 5A, management system 508 generates credentials, e.g., based on information received from credential grantors. In data repository 509, management system 508 generates associations between credentials and user identifiers (IDs) for the management system 508 for various users. Generally, a user ID includes information that uniquely identifies a user. Based on the associations, management system 508 may use a user ID in identifying one or more credentials for a particular user.

In an example, user 514 may request a new user account from management system 508, e.g., using application 512 executing on client device 506. In response to the request, management system 508 generates, in data repository 509, a record (e.g., a database entry) representing a user account for user 514. For example, management system 508 generates user ID 526 for a user account of user 514. In this example, management system 508 sends to client device 506 user ID 526, e.g., to enable user 514 to access the account of user 514.

In this example, a credential grantor may generate, in data repository 509, a record (e.g., a database entry in another table) for a group of individuals that are granted credentials as employees of Company X. In the example of FIG. 5A, credential 528 represents the database entry in another table for a group of individuals that are granted credentials as employees of Company X. In this example, the credential grantor could grant user 514 credentials of being an employee of Company X, e.g., by linking a database entry for the user account for user 514 to the database entry in the other table for the group of individuals that are granted credentials as employees of Company X. In the example of FIG. 5A, the credential grantor grants user 514 credentials of being an employee of Company X by generating an association between user ID 526 and credential 528.

Furthermore, management system 508 also may notify user 514 that user 514 has been associated with credential 528, for example, by pushing a notification to one or more of client devices 504, 506. In this example, user 514 may use user ID 526 to access credentials of user 514.

In an example, user 514 uses client device 504 to send to resource system 510 a request (not shown) to access resource 516. In response, resource system 510 sends, to management system 508, request 518 for a representation of a reference code. Generally, a representation of a reference code may include a visualization that is based on a reference code. For example, a representation of a reference code may include a QR code. In this example, the reference code may be encoded within the QR code.

In the example of FIG. 5A, request 518 includes various types of information, including, e.g., resource ID 530, session ID 532, certificate 524, an indication of an action type, and an indication of a time to live value. Generally, a resource ID includes information that uniquely identifies a resource. Through resource ID 530, request 518 includes an indication that request 518 is associated with resource 516.

In this example, session ID 532 includes information identifying a communication session established between resource system 510 and client device 504. Certificate 524 includes information identifying an entity associated with resource 516 for which access is requested. For example, the entity may be an owner of resource 516. In another example, the entity may control and/or operate resource system 510 (and/or resource 516).

In an example, the entity may be a company that uses management system 508 to regulate access to multiple, different resources (e.g., various different user accounts). In this example, a request for a representation of a reference code that provides users with access to one of the multiple, different resources references may include the certificate of the company. The certificate proves the identity of the company to management system 508.

In an example, management system 508 allows multiple different entities (e.g., credential grantors 540, 544) to regulate access to various different resources (e.g., resources 516, 546*a*-546*c* and 548*a*-548*c*), e.g., using management system 508. For example, management system 508 may allow a company to use management system 508 to regulate access to resources (e.g., employee user accounts for online email access). In addition, management system 508 may allow an educational institute to use management system 508 to regulate access to resources (e.g., e-learning websites). In this example, each of the different entities (e.g., the company and the educational institution) has its own certificate to identify itself to management system 508. Additionally, management system 508 stores copies of the certificates of the different entities, e.g., to confirm a match between one of the stored certificates and a certificate of a particular entity that is included in a request for a representation of a reference code that provides users with access to one of the resources of the particular entity.

Generally, an action type includes information specifying a type of action to be performed on data. There are various types of actions, including, e.g., an action of requesting physical access, an action of requesting logical access, and so forth. A request of physical access includes a request to access a physical resource. Generally, a physical resource may include a physical location (e.g., a building, a classroom, a laboratory, and so forth) and/or a physical object (e.g., a door, a lock, and so forth). A request of logical access includes a request to access a logical resource (also referred to as a "resource" herein).

The action type included in request 518 specifies that access to resource 516 is requested. As described in further detail below, management system 508 uses the action type included in request 518 for credential usage logging. For example, management system 508 uses the action type to track different resources (e.g., physical resources and/or logical resources) to which the user has been granted access. In this example, management system 508 is configured to generate reports about access control, e.g., information indicative of resources (e.g., physical resources and/or logical resources) to which the user has been granted access. For the generated report, management system 508 may distinguish between data for physical resources (information indicative of physical resources to which access has been granted) and data for logical resources (information indicative of logical resources to which access has been granted).

In an example, a time to live value specifies an amount of time for which the representation of the reference code is active. For example, a time to live value may specify that a QR code is valid for five minutes.

Responsive to receiving request 518, management system 508 verifies that the entity making request 518 is authorized to request a representation of a reference code for resource 516. In this example, management system 508 stores, in data repository 509, information indicative of various resource IDs and an associated certificate. For a particular entity that is using management system 508, the entity enrolls with management system 508. During the enrollment process, the entity sends, to management system 508, information indicative of various resource IDs for the entity and a certificate of the entity. Management system 508 stores, in data repository 509, the information indicative of the various resource IDs for the entity in association with the certificate of the entity. When management system 508 receives request 518, management system 508 accesses the information stored in data repository 509 to confirm that resource ID 530 and certificate 524 included in request 518 match a certificate that is stored in association with a resource ID in data repository 509. Based on the determined match, management system 508 verifies that the entity making request 518 is authorized to request a representation of a reference code for resource 516.

Following verification that the entity making request 518 is authorized to request a representation of a reference code for resource 516, management system 508 generates reference code 520. Management system 508 also associates reference code 520 with resource ID 530 in data repository 509, e.g., to ensure that management system 508 can identify that reference code 520 corresponds to resource 516. In an example, reference code 520 includes a string that references the information included in request 518. Management system 508 stores reference code 520 in data repository 509. Management system 508 also generates associations among reference code 520 and one or more of resource ID 530, session ID 532, e.g., to specify that reference code 520 references one or more of resource ID 530 and session ID 532. In an example, reference code 520 references session ID 532 to promote user 514 being granted access to resource 516 over the session that is already established between resource system 510 and client device 504.

In the example of FIG. 5A, management system 508 generates representation 522 of reference code 520. In this example, representation 522 encodes reference code 520. In an example, representation 522 is an optical machine-readable representation. In this example, management system 508 implements numerous techniques in generating optical machine-readable representations. For example, using the set of alphanumeric characters included in reference code 520, management system 508 encodes the set of alphanumeric characters to generate an optical-machine readable representation for a reference code. For example, management system 508 may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

In the example of FIG. 5A, management system 508 transmits representation 522 (or information indicative of representation 522) to resource system 510. In response, resource system 510 causes representation 522 to be displayed to user 514, e.g., by displaying representation 522 in a website (e.g., resource 516). In this example, user 514 launches application 512 on client device 506. Using a camera or other scanning device on client device 506, user 514 scans representation 522 into application 512. Application 512 generates decoded representation 534, e.g., by decoding representation 522. In this example, decoded representation 534 includes a reference code that matches reference code 520. As previously described, reference code 520 references session ID 532 to promote user 514 being granted access to resource 516 over the session that is already established between resource system 510 and client device 504. Based on the match between decoded representation 534 and reference code 520, management system 508 selects session ID 532 as being indicative of the session over which user 514 should be granted access to resource 516. In this example, management system 508 transmits session ID 532 to resource system 510, e.g., to promote user 514 being granted access to resource 516 over the session already established between resource 516 and client device 504.

In this example, application 512 is configured to store user ID 526, e.g., for user 514. As previously described, management system 508 may send, to application 512, user ID 526, e.g., when user 514 creates an account with management system 508.

Using user ID 526 and decoded representation 534, application 512 generates access request message 535 to request access to resource 516. In an example, access request message 535 also includes information indicative of a geographic location of client device 506. In this example, management system 508 may use the information indicative of the geographic location for credential usage tracking and/or for imposing conditions on access to resource 516. For example, an entity that operates resource 516 may impose a condition that resource 516 only can be accessed from one or more particular locations and/or regions. In this example, the entity that operates resource 516 sends, to management system 508, information indicative of the condition, e.g., to enable enforcement of the condition by management system 508. In an example, management system 508 may determine that the geographic location of client device 506 is in a region from which user 514 is allowed to access resource 516. In this example, responsive to determining that the geographic location of client device 506 is in the region from which user 514 is allowed to access resource 516, management system 508 may determine that user 514 is allowed to access resource 516. In another example, if management system 508 detects that client device 506 is not within one of particular locations (e.g., based on the received information indicative of the geographic location of the client device), management system 508 may deny access to resource 516. In an example, management system 508 may forward the information indicative of the geographic location to resource system 510, e.g., to enable enforcement of the condition by resource system 510.

In the example of FIG. 5A, management system 508 receives access request message 535. Using contents of access request message 535, management system 508 looks up the identity of resource 516 to which application 512 is requesting access. In this example, access request message 535 includes decoded representation 534. In this example, the contents of decoded representation 534 match the contents of reference code 520. Management system 508 identifies a match between reference code 520 and decoded representation 534. Management system 508 also determines that resource ID 530 is associated with reference code 520. Based on the match between reference code 520 and decoded representation 534 and based on the association between reference code 520 and resource ID 530, management system 508 determines that application 512 is requesting access to resource 516 that is referenced by resource ID 530.

Management system 508 also checks the time to live value (not shown) associated with reference code 520. As previously described, request 518 includes a time to live value. In this example, management system 508 stores the time to live value in association with reference code 520 in data repository 509, e.g., as the time to live specifies a "lifespan" of reference code 520. In the example of FIG. 5A, management system 508 determines a time associated with access request message 535 (e.g., a time at which access request message 535 is received or a time at which access request message 535 was generated by client device 506). Management system 508 also retrieves, from data repository 509, information indicative of a time when reference code 520 is generated. Management system 508 determines an amount of time that has elapsed from the time associated with reference code 520 to the time associated with access request message 535. If management system 508 determines that the amount of elapsed time is greater than the amount of time specified by the time to live value, management system 508 denies access request message 535 to access resource 516. In an example, management system 508 sends, to client device 506, information specifying that access is denied. Management system 508 may also send, to resource system 510, information specifying that access is denied, e.g., to enable resource system 510 to display for user 514 information specifying that access is denied.

In the example of FIG. 5A, management system 508 determines that the amount of elapsed time is less than the amount of time specified by the time to live value. In this example, management system 508 uses user ID 526 included in access request message 535 to identify the user who is requesting access to resource 516. Using resource ID 530, management system 508 identifies that certificate 524 is associated with resource ID 530. Using certificate 524, management system 508 identifies the entity (e.g., resource system 510) associated with resource 516. In this example, certificate 524 proves to management system 508 that resource system 510 is authorized by a credential issuing organization to receive credentials, including, e.g., credential 528. Based on certificate 524, management system 508 establishes a trust relationship with resource system 510 that enables management system 508 to send credentials to resource system 510.

Using user ID 526 and information identifying resource system 510, management system 508 identifies credential 528 as being held by user 514 and as being issued by resource system 510. Management system 508 sends, to resource system 510, credential 528 of user 514. Management system 508 also sends, to resource system 510, session ID 532 and resource ID 530 to provide resource system 510 with an indication of the resource 516 for which access is requested by user 514. In this example, resource system 510 applies logic (e.g., a series of rules) to the information received from management system 508. Based on application of the logic to the received information, resource system 510 determines whether user 514 should be granted access to resource 516. For example, the executed logic may determine whether credential 528 entitles user 514 to access resource 516. For example, resource system 510 may include a mapping of credentials to accessible resources. In this example, resource system 510 executes the logic to determine whether the mapping specifies that resource 516 is accessible for credential 528.

In the example of FIG. 5A, resource system 510 determines that credential 528 entitles user 514 to access resource 516. In this example, resource system 510 utilizes session ID 532 transmitted to resource system 510 by management system 508 to grant user 514 access to resource 516 via the session already established between client device 504 and resource system 510. That is, using session ID 532, resource system 510 grants user 514 access to resource 516 over the session that is already established between resource system 510 and client device 504. That is, resource system 510 uses session ID 532 to identify which session is established between resource 516 and client device 504. Resource system 510 then grants user 514 access to resource 516 over the established session.

In an example, resource 516 may use token 511 to access information that is used in automatically populating fields in resource 516 with information for user 514. In this example, resource system 510 uses session ID 532 and resource ID 530 to generate token 511 for resource 516. In this example, token 511 includes information specifying that user 514 is authorized to access resource 516. In this example, resource system 510 passes token 511 to resource 516. In response, resource 516 enables user 514 to access resource 516.

In addition, after determining that user 514 is granted access to resource 516, resource system 510 transmits, to management system 508, an indication of the grant of access. Using the indication of the grant of access, management system 508 logs, in data repository 509, information specifying that access was granted to resource 516 in association with one or more of user ID 526, credential 528 and the action type (as initially specified in request 518).

Additionally, management system 508 forwards the indication of the grant of access to client device 506, e.g., for display in application 512.

In another example, resource system 510 determines that credential 528 does not entitle user 514 to access resource 516. In this example, resource system 510 denies user 514 access to the resource 516 and terminates the session established between client device 504 and resource system 510. In addition, after determining that user 514 is not granted access to resource 516, resource system 510 transmits, to management system 508, an indication of the denial of access. Using the indication of the denial of access, management system 508 logs, in data repository 509, information specifying that access was denied to resource 516 in association with one or more of user ID 526, credential 528 and the action type (as initially specified in request 518). Additionally, management system 508 forwards the indication of the denial of access to client device 506, e.g., for display in application 512.

In an example, resource 516 may include executable instructions that cause resource 516 to periodically poll resource system 510 to determine if the session (specified by session ID 532) with client device 504 is authorized. In this example, resource 516 starts polling resource system 510 after establishing a session with client device 504. In an example, resource 516 determines that the session is authorized. In this example, resource 516 enables client device 504 to access resource 516. In another example, resource 516 is unable to determine that the session is authorized. In this example, resource 516 continues to poll resource system 510, e.g., until receipt of either a response indicating a grant of access or a response indicating a denial of access.

In a variation of FIG. 5A, resource system 510 may include various components to enable determining whether user 514 is entitled to access resource 516. For example, resource system 510 may include an access decision component (not shown), a single sign on (SSO) component (not shown), a domain controller component (e.g., an Active Directory (AD) domain controller) (not shown), and so forth. In this variation, in response to receiving credential 528, session ID 532, and resource ID 530 in a request message indicating that access to resource 516 is requested, the access decision component may determine if credential 528 entitles user 514 to access resource 516.

In an example, the access decision component determines that credential 528 entitles user 514 to access resource 516. In this example, the access decision component transmits, to the SSO component, information specifying that access to resource 516 should be granted to user 514. In response, the SSO component instructs the domain controller component to grant a token for user 514 to resource 516, e.g., in order to provide user 514 with access to resource 516. The SSO component may identify user 514 who is requesting access to the domain controller component by the user's e-mail address. In this example, the domain controller component trusts the SSO component, e.g., through a trust relationship established between the SSO component and the domain controller component. In this example, responsive to receiving the request to grant the token from the SSO component, the domain controller component grants the requested token to resource 516. Using the token, resource 516 grants user 514 access to resource 516 (e.g., via client device 504).

In another variation of FIG. 5A, management system 508 and resource system 510 are integrated into a single system. In this example, resource system 510 may be incorporated within management system 508. In this example, management system 508 executes the above-described logic attributed to resource system 510, e.g., to determine if user 514 is entitled to access resource 516. In an example, management system 508 determines that user 514 is entitled to access resource 516 and grants client device 504 access to resource 516.

Figure 6:
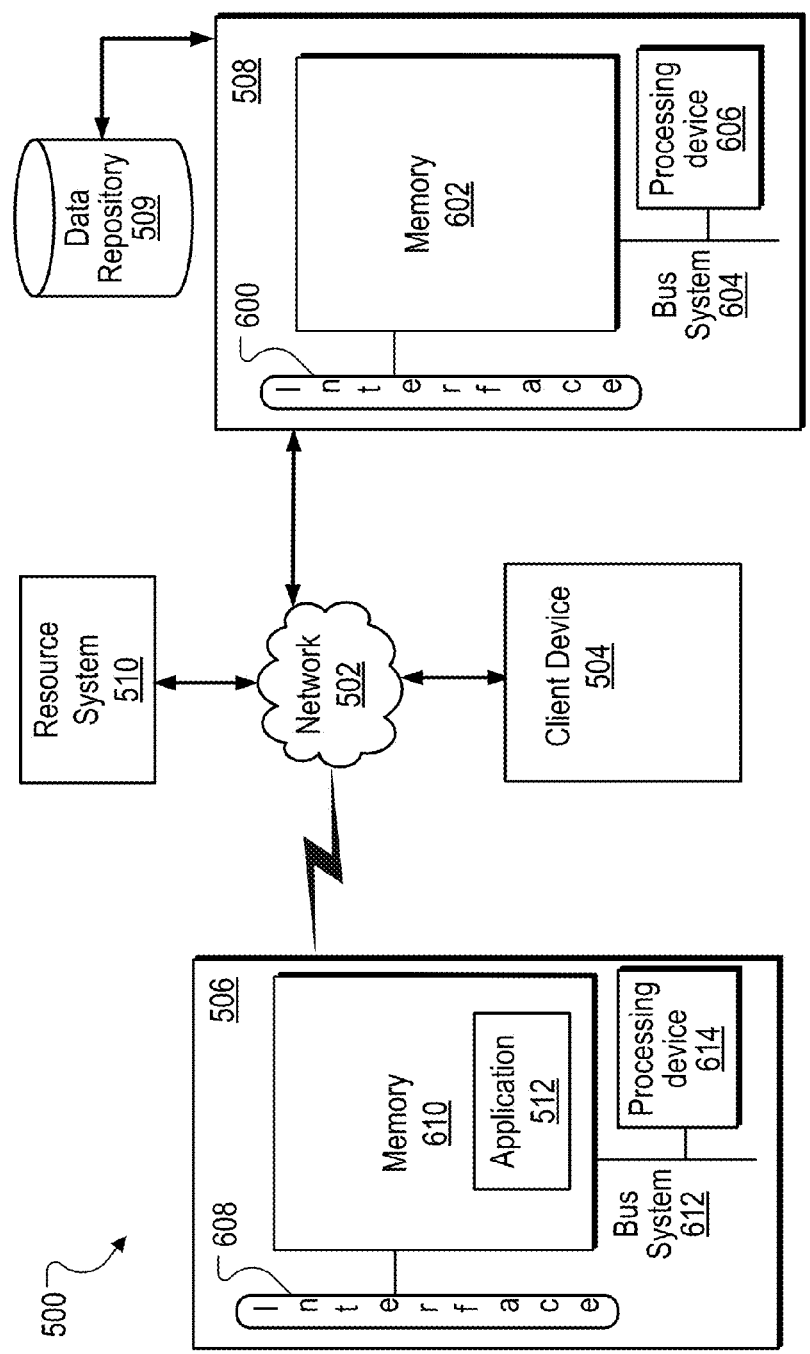
FIG. 6 is a block diagram showing examples of components of a network environment that regulates access to resources.

FIG. 6 is a block diagram of an example of the network environment 500 that regulates access to resources illustrated in FIG. 5A. Management system 508 can be a variety of computing devices capable of receiving data and running one or more services, including, e.g., an application, which can be accessed by one or more client devices 504, 506 and resource system 510. In an example, management system 508 can include a distributed computing system, a desktop computer, a laptop, a cell phone, a rack-mounted server, and the like. Management system 508 can be a single server or a group of servers that are at the same position or at different positions. Management system 508 and each of client devices 504, 506 and resource system 510 can execute programs having a client-server relationship to each other. Although distinct modules are shown in FIG. 6, in some examples, client and server programs can execute on the same device.

Management system 508 can receive data from client devices 504, 506 and/or resource system 510 through input/output (I/O) interface 600. I/O interface 600 can be a type of interface capable of receiving data over a network, including, e.g., an Ethernet interface, a wireless networking interface, a fiber-optic networking interface, a modem, and so forth. Management system 508 also includes a processing device 606 and memory 602. A bus system 604, including, for example, a data bus and a motherboard, can be used to establish and to control data communication between the components of management system 508.

Processing device 606 can include one or more microprocessors. Generally, processing device 606 can include an appropriate processor and/or logic that is capable of receiving and storing data, and of communicating over a network (e.g., network 502). Memory 602 can include a hard drive and a random access memory storage device, including, e.g., a dynamic random access memory, or other types of non-transitory machine-readable storage devices. As shown in FIG. 6, memory 602 stores computer programs that are executable by processing device 606. These computer programs may include an application for implementing the operations and/or the techniques described herein. The application can be implemented in software running on a computer device (e.g., management system 508), hardware or a combination of software and hardware.

In the example of FIG. 6, client device 506 can be a variety of computing devices capable of receiving data and running one or more services, including, e.g., application 512. In an example, client device 506 can include a server, a distributed computing system, a desktop computer, a laptop, a tablet, a smart phone, a cell phone, a rack-mounted server, and the like.

Client device 506 can receive data from one or more of client device 504 and management system 508 through I/O interface 608. I/O interface 608 can be a type of interface capable of receiving data over a network, including, e.g., an Ethernet interface, a wireless networking interface, a fiber-optic networking interface, a modem, and so forth. Client device 506 also includes a processing device 614 and memory 610. A bus system 612, including, for example, a data bus and a motherboard, can be used to establish and to control data communication between the components of client device 506.

Processing device 614 can include one or more microprocessors. Generally, processing device 614 can include an appropriate processor and/or logic that is capable of receiving and storing data, and of communicating over network 502. Memory 610 can include a hard drive and a random access memory storage device, including, e.g., a dynamic random access memory, or other types of non-transitory machine-readable storage devices. As shown in FIG. 6, memory 610 stores computer programs that are executable by processing device 614. These computer programs may include application 512 for implementing the operations and/or the techniques described herein. Application 512 can be implemented in software running on client device 506, hardware or a combination of software and hardware.

Figure 7:
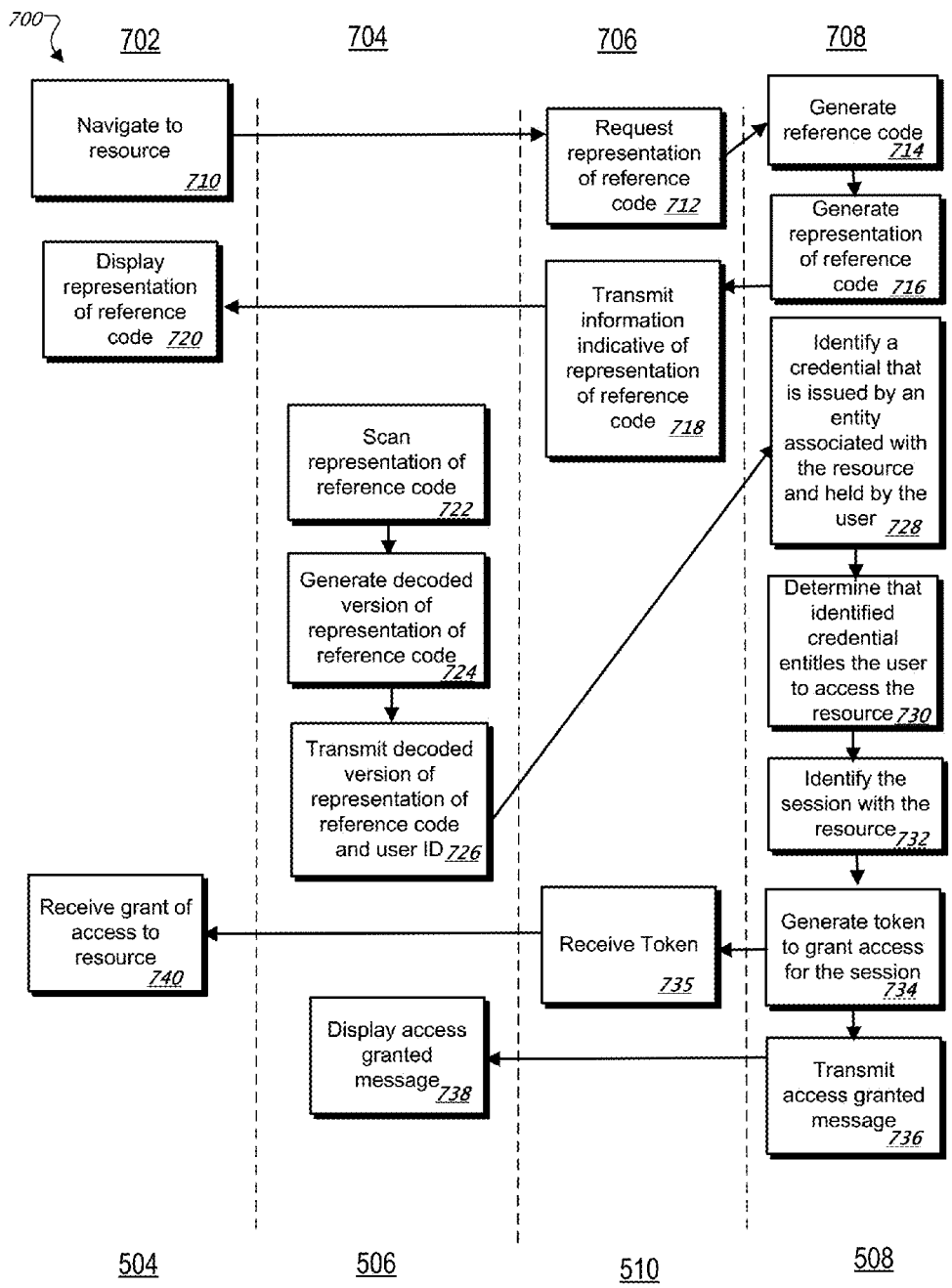
FIGS. 7 and 8 are flowcharts showing examples of processes for regulating access to resources.

FIG. 7 is a flowchart showing an example of a process 700 for regulating access to resources. In FIG. 7, process 700 is split into parts 702, 704, 706, 708. Part 702 may be performed by client device 504. Part 704 may be performed by client device 506 (and/or by application 512 running on client device 506). Part 706 may be performed by resource system 510. Part 708 may be performed by management system 508.

In operation, client device 504 navigates (710) to a resource hosted by resource system 510. For example, client device 504 may navigate to resource 516 (FIG. 5A) by requesting access to resource 516, navigating to a network address (e.g., a uniform resource locator (URL)) associated with resource 516, etc. In this example, resource system 510 detects that client device 504 is attempting to access resource 516. Resource system 510 determines that resource 516 is a secure resource for which access is regulated (e.g., only authorized users are permitted to access resource 516).

Responsive to determining that access to resource 516 is regulated, resource system 510 requests (712) a representation of a reference code from management system 508. For example, resource system 510 may request representation 522 of reference code 520. Responsive to the request, management system 508 generates (714) reference code 520. Management system 508 also generates (716) representation 522 of reference code 520. In this example, reference code 520 is encoded in representation 522.

In the example of FIG. 7, management system 508 transmits (not shown) information indicative of representation 522 to resource system 510. Resource system 510 causes representation 522 to be displayed on client device 504, e.g., by transmitting (718) the information indicative of representation 522 to client device 504. In response to receipt of the information indicative of representation 522, client device 504 displays (720) representation 522 of reference code 520. As described in greater detail below, client device 506 may scan representation 522 of reference code 520 in an effort to gain access to resource 516. In some implementations, if a period of time elapses after the representation 522 of reference code 520 has been displayed without client device 506 scanning representation 522 of reference code 520, operations 712, 714, 716, 718, and 720 may be repeated, e.g., to generate and display a representation of a new reference code.

In this example, client device 506 scans (722) representation 522 of reference code 520. For example, a user may use a camera that is part of client device 506 to take a picture of representation 522 of reference code 520. In response to scanning of representation 522 of reference code 520, client device 506 generates (724) a decoded version of representation 522 of reference code 520, e.g., by decoding representation 522. In an example, decoded representation 534 (FIG. 5A) includes the decoded version of representation 522 of reference code 520. Client device 506 also transmits (726), to management system 508, the decoded version of representation 522 of reference code 520 and a user ID that identifies a user requesting access to resource 516. In this example, the transmitted user ID includes user ID 526.

Using the decoded version of representation 522 of reference code 520, management system 508 determines (not shown) that access is requested for resource 516, e.g., based on an association between reference code 520 and resource ID 530 for resource 516. In this example, resource ID 530 is associated with information specifying an entity associated with resource 516. Using the received user ID and the information specifying the entity associated with resource 516, management system 508 identifies (728) one or more credentials that have been issued by an entity associated with resource 516 and that are held by the user requesting access to resource 516. For example, management system 508 identifies credentials that are associated with the received user ID. In this example, the credentials include information identifying an entity that issued the credentials. Using the information identifying the entity that issued the credentials, management system 508 selects, from the identified credentials, those credentials that are issued by the entity associated with resource 516. In an example, one of the selected credentials includes credential 528.

In the example of FIG. 7, management system 508 executes the above-described logic. Based on execution of the logic, management system 508 determines (730) that credential 528 entitles the user associated with client device 504 to access resource 516. In this example, management system 508 identifies (732) which session is established between client device 504 and resource system 510, e.g., based on session ID 532. Using session ID 532 and resource ID 530, management system 508 generates (734) a token to grant the user associated with client device 504 access to resource 516 via the session established between client device 504 and resource system 510. Management system 508 transmits the token to resource system 510. Resource system 510 receives (735) the token and grants client device 504 access to resource 516 in response. As a result, client device 504 receives (740) a grant of access to resource 516.

In the example of FIG. 7, management system 508 also transmits (736) to client device 506 a message specifying that the user associated with client device 504 has been granted access to resource 516. In response, client device 506 displays (738) the access granted message, e.g., via application 512.

In the example of FIG. 7, management system 508 may generate a representation of a reference code (e.g., a QR code) each time a user attempts to access a resource. In this example, management system 508 repeats actions 714, 716 each time a user attempts to access a resource. By repeating actions 714, 716, management system 508 generates a new QR code each time a user attempts to access a resource. For example, management system 508 generates a new QR code each time a user navigates to a website to attempt to access the website.

In an example, user 514 attempts to access resource 516 a first time. During this first attempt, management system 508 implements actions 714, 716 to generate a first QR code that user 514 may use in accessing resource 516. At a later point in time, user 514 again attempts to access resource 516. For example, resource 516 may be an email website. User 514 may check an email account of user 516 at a first point in time. At a later, second point in time, user 514 may want to check his/her email account again. During this second attempt, management system 508 again implements actions 714, 716 to generate a second QR code that user 514 may use in accessing resource 516 a second time.

In another example, a first user (e.g., user 514 or another user) attempts to access resource 516. In response to the attempted access, management system 508 implements actions 714, 716 to generate a first QR code that the first user may use in accessing resource 516. Another second user also attempts to access resource 516. The first user differs from the second user. In this example, the first user and the second user may attempt to access resource 516 at the same time or at different times. In response to the second user attempting to access resource 516, management system 508 implements actions 714, 716 to generate a second QR code that the second user may use in accessing resource 516. In this example, the first QR code differs from the second QR code.

Figure 8:
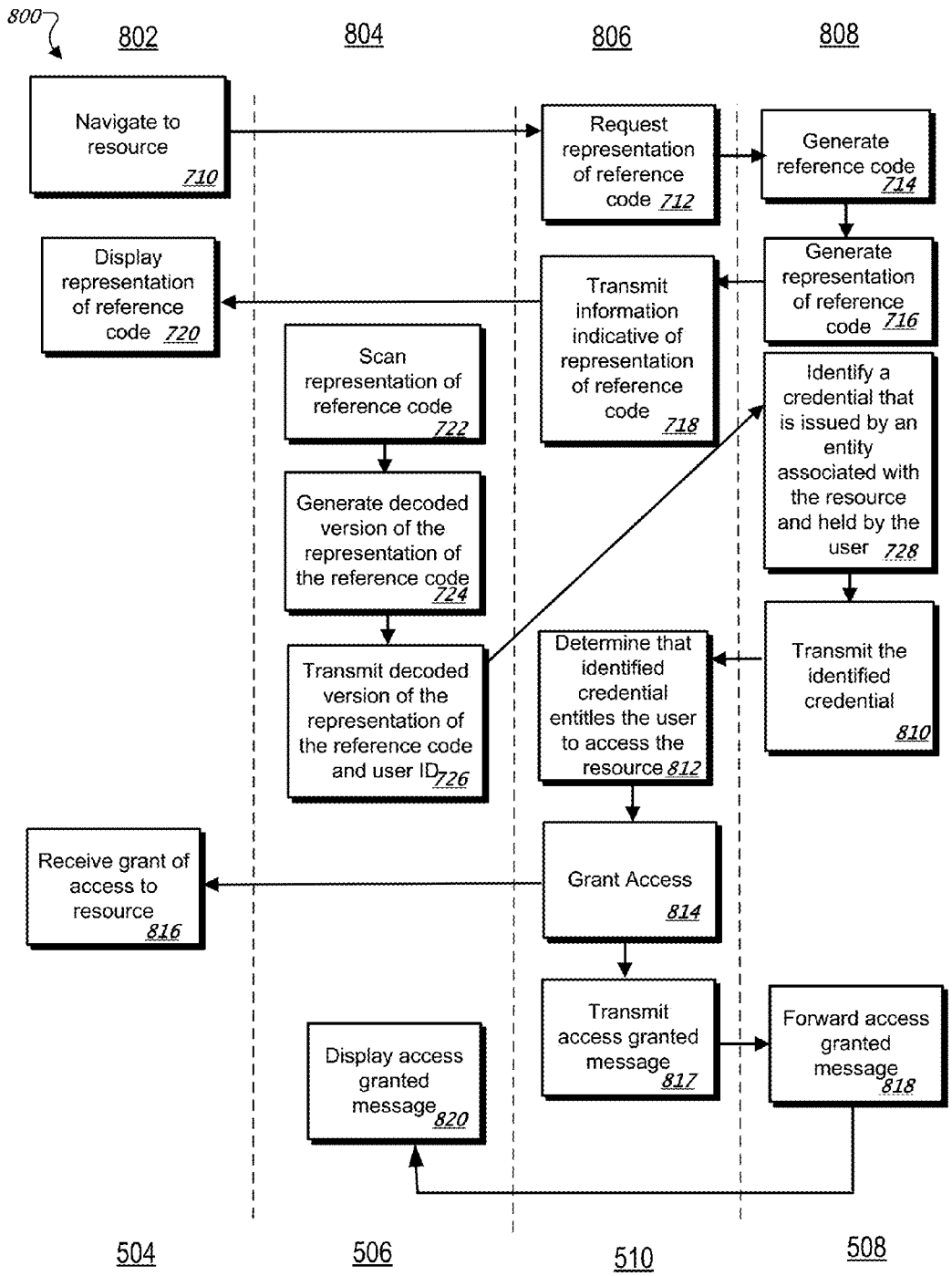

FIG. 8 is a flowchart showing an example of another process 800 for regulating access to resources. In FIG. 8, process 800 is split into parts 802, 804, 806, 808. Part 802 may be performed by client device 504. Part 804 may be performed by client device 506 (and/or by application 512 running on client device 506). Part 806 may be performed by resource system 510. Part 808 may be performed by management system 508. In operation, process 800 includes the above-described actions 710, 712, 714, 716, 718, 720, 722, 724, 726 and 728.

In the example of FIG. 8, management system 508 transmits (810), to resource system 510, one or more credentials held by the user requesting access to resource 516 (FIG. 5A). In an example, management system 508 transmits credential 528 to resource system 510. Management system 508 also transmits, to resource system 510, session ID 532 and resource ID 530, e.g., to identify that access is requested for resource 516. As described in further detail below, management system 508 transmits session ID 532 to promote the user being granted access to resource 516 over an already established session with resource 516.

Responsive to receipt of credential 528, resource ID 530 and session ID 532, resource system 510 executes the above described logic. Based on execution of the above described logic, resource system 510 determines (812) that credential 528 entitles the user associated with client device 504 to access resource 516. In response to this determination, resource system 510 grants (814) the user associated with client device 504 access to resource 516. Using session ID 532, resource system 510 grants the user access to resource 516 over the session that is already established between resource system 510 and client device 504. That is, resource system 510 uses session ID 532 to identify which session is established between resource 516 and client device 504. Resource system 510 then grants the user access to resource 516 over the established session. Client device 504 then receives (816) the grant of access to resource 516.

Responsive to resource system 510 granting the user access, resource system 510 transmits (817), to management system 508, a message specifying that the user is granted access to resource 516. In the example of FIG. 8, management system 508 forwards (818) the message to client device 506. Client device 506 displays (820) the forwarded message, e.g., via application 512.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processing devices, comprising:
  receiving, by the one or more processing devices from a client device, a request for access to a hosted resource, the request for access comprising a decoded version of a representation of a reference code that is associated with the hosted resource, with the representation being generated by the one or more processing devices;
  determining, by the one or more processing devices, a correspondence between (i) the decoded version of the representation of the reference code received from the client device, and (ii) the generated reference code associated with the hosted resource;
  responsive to the determined correspondence, determining, that access is requested for the hosted resource;
  matching, by the one or more processing devices, (i) at least a portion of contents of the request for access that is received from the client device and that comprises the decoded version of the representation of the reference code for the hosted resource, to (ii) stored information specifying one or more users authorized to access the hosted resource;
  determining, based on the matching, that a user who is requesting access to the hosted resource is permitted to access the hosted resource;
  responsive to determining that the user is permitted to access the hosted resource, enabling the user to access the hosted resource.

2. The method of claim 1, wherein:
  the request for access to the hosted resource further comprises an indication of a geographic location of the client device; and
  determining that the user who is requesting access to the hosted resource is permitted to access the hosted resource comprises:
    determining that the geographic location of the client device is in a region from which the user is permitted to access the hosted resource; and
    responsive to determining that the geographic location of the client device is in the region from which the user is permitted to access the hosted resource, determining that the user who is requesting access to the hosted resource is permitted to access the hosted resource.

3. The method of claim 1, wherein determining that the user who is requesting access to the hosted resource is permitted to access the hosted resource comprises:
   determining, based on the contents of the request for access, an identity of the user who is requesting access to the hosted resource;
   identifying, based on the identity of the user, one or more credentials of the user that have been granted by an entity associated with the hosted resource; and
   determining, based on the identified one or more credentials, that the user is permitted to access the hosted resource.

4. The method of claim 1, wherein the client device comprises a first client device, and wherein receiving the request for the representation of the reference code for accessing the hosted resource comprises:
   receiving request information, the request information comprising (i) information indicative of a resource identifier of the hosted resource, (ii) information indicative of an action type, the action type specifying that access to the hosted resource is requested, (iii) a session identifier that identifies a session established between a second client device and a system hosting the resource, wherein the second client device is for viewing the hosted resource, (iv) a certificate that identifies an entity associated with the hosted resource, and (v) information indicative of a time to live value, with the time to live value specifying an amount of time for which the representation of the reference code is active;
   storing the request information in a data repository; and
   generating associations among items of the received request information and the generated reference code, wherein the reference code references the received request information through the associations.

5. The method of claim 4, further comprising:
   responsive to determining that the user is permitted to access the hosted resource,
      identifying the session identifier that is associated with the reference code for the hosted resource;
      identifying the resource identifier that is associated with the reference code for the hosted resource; and
      generating a token based on the identified session identifier and the identified resource identifier; and
      transmitting, to the system hosting the hosted resource, the generated token for granting the user access to the hosted resource, wherein access to the hosted resource is granted through the session established between the second client device and the system hosting the hosted resource.

6. The method of claim 4, further comprising:
   determining a time at which the request for access to the hosted resource is received;
   retrieving, from the data repository, information indicative of a time when the reference code is generated;
   determining an amount of time that has elapsed from the time when the reference code is generated to the time when the request for access to the hosted resource is received; and
   determining that the amount of elapsed time is less than the amount of time specified by the time to live value;
   wherein determining the identity of the user who is requesting access to the hosted resource comprises:
      responsive to determining that the amount of elapsed time is less than the amount of time specified by the time to live value, determining the identity of the user who is requesting access to the hosted resource.

7. One or more machine-readable hardware storage devices storing instructions that are executable by one or more processing devices to perform operations comprising:
   receiving, by the one or more processing devices from a client device, a request for access to a hosted resource, the request for access comprising a decoded version of a representation of a reference code that is associated with the hosted resource, with the representation being generated by the one or more processing devices;
   determining, by the one or more processing devices, a correspondence between (i) the decoded version of the representation of the reference code received from the client device, and (ii) the generated reference code associated with the hosted resource;
   responsive to the determined correspondence, determining, that access is requested for the hosted resource;
   matching, by the one or more processing devices, (i) at least a portion of contents of the request for access that is received from the client device and that comprises the decoded version of the representation of the reference code for the hosted resource, to (ii) stored information specifying one or more users authorized to access the hosted resource;
   determining, based on the matching, that a user who is requesting access to the hosted resource is permitted to access the hosted resource;
   responsive to determining that the user is permitted to access the hosted resource, enabling the user to access the hosted resource.

8. The one or more machine-readable hardware storage devices of claim 7, wherein:
   the request for access to the hosted resource further comprises an indication of a geographic location of the client device; and
   determining that the user who is requesting access to the hosted resource is permitted to access the hosted resource comprises:
      determining that the geographic location of the client device is in a region from which the user is permitted to access the hosted resource; and
      responsive to determining that the geographic location of the client device is in the region from which the user is permitted to access the hosted resource, determining that the user who is requesting access to the hosted resource is permitted to access the hosted resource.

9. The one or more machine-readable hardware storage devices of claim 7, wherein determining that the user who is requesting access to the hosted resource is permitted to access the hosted resource comprises:
   determining, based on the contents of the request for access, an identity of the user who is requesting access to the hosted resource;
   identifying, based on the identity of the user, one or more credentials of the user that have been granted by an entity associated with the hosted resource; and
   determining, based on the identified one or more credentials, that the user is permitted to access the hosted resource.

10. The one or more machine-readable hardware storage devices of claim 7, wherein the client device comprises a first client device, and wherein receiving the request for the representation of the reference code for accessing the hosted resource comprises:
   receiving request information, the request information comprising (i) information indicative of a resource identifier of the hosted resource, (ii) information indicative of an action type, the action type specifying that access to the hosted resource is requested, (iii) a session identifier that identifies a session established between a second client device and a system hosting the resource, wherein the second client device is for viewing the hosted resource, (iv) a certificate that identifies an entity associated with the hosted resource, and (v) information indicative of a time to live value, with the time to live value specifying an amount of time for which the representation of the reference code is active;

storing the request information in a data repository; and generating associations among items of the received request information and the generated reference code, wherein the reference code references the received request information through the associations.

11. The one or more machine-readable hardware storage devices of claim 10, wherein the operations further comprise:

responsive to determining that the user is permitted to access the hosted resource,
identifying the session identifier that is associated with the reference code for the hosted resource;
identifying the resource identifier that is associated with the reference code for the hosted resource; and
generating a token based on the identified session identifier and the identified resource identifier; and
transmitting, to the system hosting the hosted resource, the generated token for granting the user access to the hosted resource, wherein access to the hosted resource is granted through the session established between the second client device and the system hosting the hosted resource.

12. The one or more machine-readable hardware storage devices of claim 10, wherein the operations further comprise:

determining a time at which the request for access to the hosted resource is received;
retrieving, from the data repository, information indicative of a time when the reference code is generated;
determining an amount of time that has elapsed from the time when the reference code is generated to the time when the request for access to the hosted resource is received; and
determining that the amount of elapsed time is less than the amount of time specified by the time to live value;
wherein determining the identity of the user who is requesting access to the hosted resource comprises:
responsive to determining that the amount of elapsed time is less than the amount of time specified by the time to live value, determining the identity of the user who is requesting access to the hosted resource.

13. An electronic system comprising:
one or more processing devices; and
one or more machine-readable hardware storage devices storing instructions that are executable by the one or more processing devices to perform operations comprising:
receiving, by the one or more processing devices from a client device, a request for access to a hosted resource, the request for access comprising a decoded version of a representation of a reference code that is associated with the hosted resource, with the representation being generated by the one or more processing devices;
determining, by the one or more processing devices, a correspondence between (i) the decoded version of the representation of the reference code received from the client device, and (ii) the generated reference code associated with the hosted resource;
responsive to the determined correspondence, determining, that access is requested for the hosted resource;
matching, by the one or more processing devices, (i) at least a portion of contents of the request for access that is received from the client device and that comprises the decoded version of the representation of the reference code for the hosted resource, to (ii) stored information specifying one or more users authorized to access the hosted resource;
determining, based on the matching, that a user who is requesting access to the hosted resource is permitted to access the hosted resource;
responsive to determining that the user is permitted to access the hosted resource, enabling the user to access the hosted resource.

14. The electronic system of claim 13, wherein:
the request for access to the hosted resource further comprises an indication of a geographic location of the client device; and
determining that the user who is requesting access to the hosted resource is permitted to access the hosted resource comprises:
determining that the geographic location of the client device is in a region from which the user is permitted to access the hosted resource; and
responsive to determining that the geographic location of the client device is in the region from which the user is permitted to access the hosted resource, determining that the user who is requesting access to the hosted resource is permitted to access the hosted resource.

15. The electronic system of claim 13, wherein determining that the user who is requesting access to the hosted resource is permitted to access the hosted resource comprises:
determining, based on the contents of the request for access, an identity of the user who is requesting access to the hosted resource;
identifying, based on the identity of the user, one or more credentials of the user that have been granted by an entity associated with the hosted resource; and
determining, based on the identified one or more credentials, that the user is permitted to access the hosted resource.

16. The electronic system of claim 13, wherein the client device comprises a first client device, and wherein receiving the request for the representation of the reference code for accessing the hosted resource comprises:
receiving request information, the request information comprising (i) information indicative of a resource identifier of the hosted resource, (ii) information indicative of an action type, the action type specifying that access to the hosted resource is requested, (iii) a session identifier that identifies a session established between a second client device and a system hosting the resource, wherein the second client device is for viewing the hosted resource, (iv) a certificate that identifies an entity associated with the hosted resource, and (v) information indicative of a time to live value, with the time to live value specifying an amount of time for which the representation of the reference code is active;

storing the request information in a data repository; and generating associations among items of the received request information and the generated reference code, wherein the reference code references the received request information through the associations.

17. The electronic system of claim 16, wherein the operations further comprise:
   responsive to determining that the user is permitted to access the hosted resource,
      identifying the session identifier that is associated with the reference code for the hosted resource;
   identifying the resource identifier that is associated with the reference code for the hosted resource; and
   generating a token based on the identified session identifier and the identified resource identifier;
   transmitting, to the system hosting the hosted resource, the generated token for granting the user access to the hosted resource, wherein access to the hosted resource is granted through the session established between the second client device and the system hosting the hosted resource.

18. The electronic system of claim 16, wherein the operations further comprise:
   determining a time at which the request for access to the resource is received;
   retrieving, from the data repository, information indicative of a time when the reference code is generated;
   determining an amount of time that has elapsed from the time when the reference code is generated to the time when the request for access to the resource is received; and
   determining that the amount of elapsed time is less than the amount of time specified by the time to live value;
   wherein determining the identity of the user who is requesting access to the hosted resource comprises:
   responsive to determining that the amount of elapsed time is less than the amount of time specified by the time to live value, determining the identity of the user who is requesting access to the hosted resource.

* * * * *